(12) United States Patent
Colvin et al.

(10) Patent No.: US 6,743,839 B2
(45) Date of Patent: Jun. 1, 2004

(54) MODIFICATION OF ASPHALT CEMENT

(75) Inventors: Howard Allen Colvin, Akron, OH (US); Edwin Gresham Moore, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/402,821

(22) Filed: Mar. 28, 2003

(65) Prior Publication Data

US 2003/0187105 A1 Oct. 2, 2003

Related U.S. Application Data

(62) Division of application No. 09/712,587, filed on Nov. 14, 2000, now Pat. No. 6,573,315.
(60) Provisional application No. 60/193,223, filed on Mar. 30, 2000.

(51) Int. Cl.$^7$ ................................................. C08F 95/00
(52) U.S. Cl. ............................ 524/68; 524/71; 524/434
(58) Field of Search .............................. 524/59, 60, 68, 524/69, 71, 250, 271, 434

(56) References Cited

U.S. PATENT DOCUMENTS 5,371,121 A * 12/1994 Bellomy et al. ............... 524/68
H1484 H * 9/1995 Collins ......................... 524/59

* cited by examiner

Primary Examiner—Robert D. Harlan
(74) Attorney, Agent, or Firm—Alvin T. Rockhill

(57) ABSTRACT

This invention is based upon the discovery that a polydiene rubber that is comprised of repeat units that are derived from a conjugated diene monomer and sulfur can be used to improved the force ductility, elastic recovery, toughness and tenacity of asphalt cement. The polydiene rubber that is comprised of repeat units that are derived from a conjugated diene monomer and sulfur also exhibits excellent compatibility with asphalt. The repeat units in the polydiene rubber that are derived from sulfur are in the backbone of the polymer. These repeat units that are derived from sulfur typically contain from 2 to 8 sulfur atoms ($—S_n—$). The subject invention more specifically relates to a modified asphalt cement which is comprised of (i) from about 90 weight percent to about 99 weight percent asphalt; (ii) from about 1 weight percent to about 10 weight percent of a polydiene rubber that is comprised of repeat units that are derived from a conjugated diene monomer and sulfur. The present invention also reveals an asphalt concrete which is comprised of (A) from about 90 weight percent to about 99 weight percent of an aggregate and (B) from about 1 weight percent to about 10 weight percent of a modified asphalt cement which is comprised of (i) from about 90 weight percent to about 99 weight percent asphalt; (ii) from about 1 weight percent to about 10 weight percent of a polydiene rubber that is comprised of repeat units that are derived from a conjugated diene monomer and sulfur. The present invention also discloses a process for preparing a modified asphalt cement which comprises (1) blending from about 1 to about 10 parts by weight of a polydiene rubber that is comprised of repeat units that are derived from a conjugated diene monomer and sulfur into from about 90 to about 99 parts by weight of asphalt at a temperature which is within the range of about 130° to about 230° C. to produce a polymer-asphalt blend; and (2) mixing from about 0.1 to about 3 parts by weight of sulfur into the polymer-asphalt blend to produce the modified asphalt cement.

16 Claims, No Drawings

MODIFICATION OF ASPHALT CEMENT

This is a divisional of U.S. patent application Ser. No. 09/712,587, now U.S. Pat. No. 6,573,315 filed on Nov. 14, 2000, which claims the benefit of U.S. Provisional Application Serial No. 60/193,223, filed on Mar. 30, 2000.

BACKGROUND OF THE INVENTION

Since the days of the Roman Empire importance of a good transportation system that includes roads and highways has been appreciated. By about 300 B.C., the first section of the Appian Way extending from Rome to Capua was built. Some of the more than 50,000 miles of roadway ultimately built in the Roman Empire was constructed with heavy stone. However, not much progress was made in the art of road construction from the era of the Roman Empire until the development of the motor vehicles, such as automobiles and trucks.

For centuries, stone blocks, wood blocks, vitrified brick and natural asphalt (bitumen) have been used to pave roads and highways. However, at the beginning of the automobile era, most rural roadway surfacing consisted of broken stone or gravel. Such roads were often rough, dusty and clearly inadequate for modern automobile and truck traffic.

Today, the United States has the most extensive highway system in the world with about 2,000,000 miles of paved road. Napoleon realized the importance of roadway systems and built such a system in France which today has the second most extensive system of paved roadways in the world covering about 500,000 miles. Germany, Japan, Great Britain, India and Australia also currently have systems of paved roads that extend well over 100,000 miles. In addition to these public roadways, there are countless paved driveways, parking lots, airport runways, and taxiways all over the world.

Today, roads, highways, driveways and parking lots are often paved with asphalt concrete. Pavement can be made with asphalt concrete that is dust-free, smooth and which offers the strength required for modem automobile and heavy truck traffic. Asphalt concrete is generally made by mixing aggregate (sand and gravel or crushed stone) with the proper quantity of asphalt cement at an elevated temperature. The hot asphalt concrete is then placed by a layering machine or paver on the surface being paved and thoroughly rolled before the asphalt concrete mixture cools. The asphalt concrete is normally applied at a thickness varying from about 25 to about 100 millimeters.

Asphalt concrete pavements can be made to be very smooth which offers outstanding frictional resistance for vehicles operating thereon. Such asphalt concrete pavement can also be repaired simply by adding additional hot asphalt concrete to holes and other types of defects which develop in the surface. Asphalt concrete pavements can also be upgraded easily by adding additional layers of hot asphalt concrete to old surfaces which are in need of repair.

Even though asphalt concrete offers numerous benefits as a paving material, its use is not trouble-free. One major problem encountered with asphalt concrete pavements is the loss of the adhesive bond between the aggregate surface and the asphalt cement. This breaking of the adhesive bond between the asphalt cement and the aggregate surface is known as "stripping." The stripping of asphalt binder from aggregate surfaces results in shorter pavement life and many millions of dollars of maintenance work on American highways each year. Reduction of this stripping tendency is of great benefit for improving the condition of roads and lowering road maintenance costs.

Over the years, various methods have been developed to reduce stripping tendencies. For instance, amines and lime are known to act as anti-stripping agents and are frequently applied to the surface of the aggregate prior to mixing it with the asphalt cement in making asphalt concrete. U.S. Pat. No. 5,219,901 discloses a technique for reducing stripping tendencies which involves coating the aggregate with a thin, continuous film of a water-insoluble high molecular weight organic polymer, such as an acrylic polymer or a styrene-acrylic polymer.

U.S. Pat. No. 5,262,240 discloses a technique for providing aggregate with a high level of resistance to stripping by water, which comprises: (1) mixing the aggregate with latex to form a latex/aggregate mixture which is comprised of from about 0.005 weight percent to about 0.5 weight percent dry polymer; (2) heating the latex/aggregate mixture to a temperature which is within the range of about 66° C. to about 232° C.; (3) maintaining the latex/aggregate mixture at said elevated temperature for a time which is sufficient to reduce the moisture content of the latex/aggregate mixture below about 0.7 weight percent and to allow the polymer in the latex to crosslink on the surface of the aggregate to produce the coated aggregate.

At high service temperatures, such as those experienced on hot summer days, asphalt concrete can experience rutting and shoving. On the other hand, at low service temperatures, such as those experienced during cold winter nights, asphalt concrete can also experience low temperature cracking. To combat these problems, it is known in the art to modify asphalt cements with rubbery polymers, such as styrene-butadiene rubber (SBR). In some approaches, the SBR is added to the asphalt as a dry rubber while in others it is added as a latex. Such modification techniques can greatly improve resistance to rutting, shoving and low temperature cracking. However, the rubbery polymers used in such applications have a tendency to phase separate from hot asphalt cements due to poor compatibility. A solution to the problem of poor compatibility is offered by the technique disclosed in U.S. Pat. No. 5,002,987.

U.S. Pat. No. 5,002,987 relates to a modified asphalt cement containing from about 90 to about 99 parts by dry weight of an asphalt cement and from about 1 to about 10 parts by dry weight of a rubber latex having a weight average molecular weight of less than 250,000 and a Mooney viscosity of less than 50. The latex is a random polymer comprising from about 60 to 100 weight percent of at least one conjugated diolefin containing from 4 to 6 carbon atoms and from about 0 to 40 weight percent styrene. This latex polymer is highly compatible with the asphalt and provides good ductility that results in good resistance to low temperature cracking. However, the utilization of the rubbery polymers described in U.S. Pat. No. 5,002,987 in asphalt cements provide little improvement in elastic recovery or toughness. Thus, their use results in compromised rutting and shoving characteristics. There accordingly is a current need for a modifier which is compatible with asphalt cement and which improves the resistance of asphalt concrete made therewith to rutting, shoving and low temperature cracking.

U.S. Pat. No. 5,534,568 reveals an asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of) asphalt and (2) from about 1 weight percent to about 10 weight percent of a rubbery polymer which is comprised of repeat units which are derived from (a) about 64 weight percent to about 84.9 weight percent of a conjugated diolefin monomer, (b) about 15 weight percent to about 33 weight percent of a vinyl aromatic monomer and (c) about 0.1 weight percent to about 3 weight percent of isobutoxymethyl acrylamide.

U.S. Pat. No. 4,145,322 discloses a process for making a bitumen-polymer composition which consists of contacting with each other, at a temperature between 130° C. and 230° C., 80 to 98 weight percent of a bitumen exhibiting a penetration value between 30 and 220, and 2 to 20 weight percent of a block copolymer, with an average molecular weight between 30,000 and 330,000 having the theoretical formula $S_x$—$B_y$ in which S corresponds to the styrene structure groups, B corresponds to the conjugated diene structure groups, and x and y are integers, stirring the obtained mixture for at least two hours, then adding 0.1 to 3 percent by weight of elemental sulfur with respect to the bitumen and maintaining the mixture thus obtained under agitation for at least 20 minutes.

Batch polymerization techniques are normally used in synthesizing block copolymers that are utilized in modifying asphalt in order to attain desired performance characteristics. However, it is highly desirable from a cost standpoint to synthesize such polymers by utilizing continuous polymerization techniques. It would also be highly desirable to increase the force ductility, elastic recovery, toughness and tenacity of asphalt which is modified with such polymers. U.S. Pat. No. 5,986,010 discloses a technique for synthesizing, by a continuous polymerization process, a styrene-butadiene polymer which is highly suitable for modifying asphalt to improve force ductility, elastic recovery, toughness and tenacity.

U.S. Pat. No. 5,986,010 specifically discloses a process for synthesizing a styrene-butadiene polymer which is particularly useful for modifying asphalt by a continuous polymerization process, said process comprising the steps of: (1) continuously charging 1,3-butadiene monomer, an organo lithium compound, a polar modifier and an organic solvent into a first polymerization zone, (2) allowing the 1,3-butadiene monomer to polymerize in said first polymerization zone to a conversion of at least about 90 percent to produce a living polymer solution which is comprised of said organic solvent and living polybutadiene chains having a number average molecular weight which is within the range of about 20,000 to about 60,000, (3) continuously withdrawing said living polymer solution from said first reaction zone, (4) continuously charging styrene monomer, divinyl benzene and the living polymer solution being withdrawn from the first polymerization zone into a second polymerization zone, (5) allowing the styrene monomer and divinyl benzene monomer to polymerize in said second polymerization zone to produce a solution of styrene-butadiene polymer having a number average molecular weight which is within the range of about 30,000 to about 85,000 and (6) continuously withdrawing the solution of said styrene-butadiene polymer from the second polymerization zone.

U.S. Pat. No. 6,136,899 discloses an asphalt concrete which is comprised of (A) from about 90 weight percent to about 99 weight percent of an aggregate and (B) from about 1 weight percent to about 10 weight percent of a modified asphalt cement which is comprised of (1) from about 90 weight percent to about 99 weight percent of asphalt; and (2) from about 1 weight percent to about 10 weight percent of a rubbery polymer which is comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9. The rubbery polymer disclosed in U.S. Pat. No. 6,136,899 is comprised of a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points.

SUMMARY OF THE INVENTION

This invention is based upon the discovery that polydiene rubber that is comprised of repeat units that are derived from a conjugated diene monomer and sulfur can be used to improved the force ductility, elastic recovery, toughness and tenacity of asphalt cement. Surprisingly, the polydiene rubber that is comprised of repeat units that are derived from a conjugated diene monomer and sulfur exhibits excellent compatibility with asphalt.

The subject invention more specifically relates to a modified asphalt cement which is comprised of (i) from about 90 weight percent to about 99 weight percent asphalt; (ii) from about 1 weight percent to about 10 weight percent of a polydiene rubber that is comprised of repeat units that are derived from a conjugated diene monomer and sulfur.

The present invention also discloses an asphalt concrete which is comprised of (A) from about 90 weight percent to about 99 weight percent of an aggregate and (B) from about 1 weight percent to about 10 weight percent of a modified asphalt cement which is comprised of (i) from about 90 weight percent to about 99 weight percent asphalt; (ii) from about 1 weight percent to about 10 weight percent of a polydiene rubber that is comprised of repeat units that are derived from a conjugated diene monomer and sulfur.

The subject invention further reveals a process for preparing a modified asphalt cement which comprises (1) blending from about 1 to about 10 parts by weight of a polydiene rubber that is comprised of repeat units that are derived from a conjugated diene monomer and sulfur into from about 90 to about 99 parts by weight of asphalt at a temperature which is within the range of about 130° to about 230° C. to produce a polymer-asphalt blend; and (2) mixing from about 0.1 to about 3 parts by weight of sulfur into the polymer-asphalt blend to produce the modified asphalt cement.

DETAILED DESCRIPTION OF THE INVENTION

The polydiene rubber that is comprised of repeat units that are derived from a conjugated diene monomer and sulfur that is used to modify asphalt cement in accordance with this invention can be made by a batch or a continuous emulsion polymerization using a free radical initiator system. This is carried out by adding the conjugated diolefin monomer, sulfur, water, a free radical generator, and a soap system to a polymerization zone to form an aqueous polymerization medium. The polymerization zone will normally be a reactor or series of two or more reactors. Polymerization is initiated with the free radical generator. This polymerization reaction results in the formation of a latex of the polydiene rubber that is comprised of repeat units that are derived from the conjugated diene monomer and sulfur.

The conjugated diolefin monomer will generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Other ethylenically unsaturated monomers can also be copolymerized into the polydiene rubber that is comprised of repeat units that are derived from the conjugated diene monomer and sulfur. Some representative examples of additional ethylenically unsaturated monomers that can potentially be synthesized into the polydiene rubber include alkyl acrylates, such as methyl acrylate, ethyl acrylate, butyl acrylate, methyl methacrylate, and the like; vinylidene monomers having one or more terminal $CH_2=CH$-groups; vinyl aromatics, such as styrene, α-methylstyrene, bromostyrene, chlorostyrene, fluorostyrene, and the like; vinyl halides, such as 1,1-dichloroethene (vinylidene chloride), 1,2-dichloroethene, and the like; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide, and the like.

The polydiene rubber that is comprised of repeat units that are derived from a conjugated diene monomer and sulfur can be a copolymer of one or more conjugated diene monomers with one or more other ethylenically unsaturated monomers. Such polydiene rubbers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in the asphalt compositions of this invention. In such cases, the polydiene rubber will, of course, also contain repeat units that are derived from sulfur.

Vinyl aromatic monomers are probably the most important group of ethylenically unsaturated monomers that can be incorporated into the polydiene rubbers employed in the asphalt compositions of this invention. Such vinyl aromatic monomers are, of course, selected so as to be copolymerizable with the conjugated diolefin monomers being utilized. Generally, any vinyl aromatic monomer that is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene, and the like. Terpolymer rubbers of 1,3-butadiene, styrene, and sulfur are particularly preferred.

In synthesizing sulfur containing SBR latex generally from about 10 weight percent to about 40 weight percent styrene and from about 60 weight percent to about 90 weight percent 1,3-butadiene are copolymerized. It is typically preferred for the SBR to contain from about 20 weight percent to about 30 weight percent styrene and from about 70 weight percent to about 80 weight percent 1,3-butadiene. It is normally most preferred for the SBR to contain from about 24 weight percent to about 28 weight percent styrene and from about 72 weight percent to about 76 weight percent 1,3-butadiene. Like ratios of styrene monomer and butadiene monomer will accordingly be charged into the polymerization zone.

U.S. Pat. No. 6,136,899 discloses a styrene-butadiene rubber (SBR) composition that can be used to modify asphalt cement. The styrene-butadiene rubber composition disclosed by U.S. Pat. No. 6,136,899 is a blend of (i) a high molecular weight styrene-butadiene rubber having a weight average molecular weight of at least about 300,000 and (ii) a low molecular weight styrene-butadiene rubber having a weight average molecular weight of less than about 280,000; wherein the ratio of the high molecular weight styrene-butadiene rubber to the low molecular weight styrene-butadiene rubber is within the range of about 80:20 to about 25:75; and wherein the bound styrene content of the high molecular weight styrene-butadiene rubber differs from the bound styrene content of the low molecular weight styrene-butadiene rubber by at least 5 percentage points. These styrene-butadiene rubber compositions are comprised of repeat units which are derived from styrene and 1,3-butadiene, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9. The styrene-butadiene rubber in the compositions disclosed by U.S. Pat. No. 6,136,899 can be modified by conducting the emulsion polymerization in the presence of sulfur in accordance with the technique of this invention. The styrene-butadiene rubber compositions made by such a technique are comprised of repeat units which are derived from styrene, 1,3-butadiene, and sulfur, wherein the styrene-butadiene rubber composition has a number average molecular weight as determined by field flow fractionation which is within the range of about 50,000 to 150,000 and wherein the styrene-butadiene rubber has a light scattering to refractive index ratio which is within the range of 1.8 to 3.9. Such styrene-butadiene rubber compositions can be used advantageously in modifying asphalt compositions. The teachings of U.S. Pat. No. 6,136,899 are accordingly incorporated herein by reference in their entirety.

The amount of sulfur charged into the polymerization zone will typically be within the range of about 0.01 phm (parts per 100 parts by weight of monomer) to about 20 phm and will more typically be within the range of about 0.05 phr to about 5 phm. The amount of sulfur charged into the polymerization zone will preferably be within the range of about 0.1 phm to about 1 phm and will more preferably be within the range of about 0.03 phr to about 0.7 phm. The sulfur charged into the polymerization zone is conventional elemental sulfur. The sulfur will typically be in the form of a powder. It is preferred for the sulfur to be in the form of a powder having a small particle size. For instance, "rubber makers sulfur" can be used utilized. Optimally, a finely divided dispersion of sulfur in water can be used.

Essentially any type of free radical generator can be used to initiate the free radical emulsion polymerization. For example, free radical generating chemical compounds, ultraviolet light or radiation can be used. In order to ensure a satisfactory polymerization rate, uniformity, and a controllable polymerization, free radical generating chemical agents which are water or oil soluble under the polymerization conditions are typically used.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiusobutyrate, azodiusobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations.

The amount of initiator employed will vary with the desired molecular weight of the SBR being synthesized. Higher molecular weights are achieved by utilizing smaller quantities of the initiator and lower molecular weights are attained by employing larger quantities of the initiator. However, as a general rule from 0.005 to 1 phm (parts by weight per 100 parts by weight of monomer) of the initiator will be included in the reaction mixture. In the case of metal persulfate initiators most commonly from 0.1 to 0.5 phm will be employed in the polymerization medium.

A wide variety of soap systems can be used to emulsify the polymerization medium. For instance, an anionic, cationic or non-ionic emulsifier can be employed. A combination of rosin acid and fatty acid emulsifiers can be employed with excellent results. In such systems, the weight ratio of fatty acid soaps to rosin acid soaps will be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is charged into the first polymerization zone in practicing this invention. The total amount of soap employed will normally be within the range of about 1 phm to 5 phm. It is typically preferred to utilize a level of soap that is within the range of about 2 phm to about 3.5 phm. In most cases it will be most preferred to use an amount of the soap system which is within the range of about 2.5 phm to 3 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 20° F. to about 80° F. It is generally preferred for the polymerization to be carried out at a temperature that is within the range of 30° F. to about 65° F. It is typically more preferred to utilize a polymerization temperature which is within the range of about 45° F. to about 55° F. To increase conversion levels, it can be advantageous to increase the temperature as the polymerization proceeds.

The polymerizations employed in making the polydiene rubber that is comprised of repeat units that are derived from a conjugated diene monomer and sulfur are typically initiated by adding the initiator to the aqueous polymerization medium that contains the conjugated diene monomer, sulfur, water and emulsifier. Such polymerizations are typically carried out utilizing continuous polymerization techniques. In such continuous polymerizations, monomer and initiator are continuously added to the organic polymerization medium with a latex of the polydiene rubber that is comprised of repeat units that are derived from a conjugated diene monomer and sulfur being continuously withdrawn. Such continuous polymerizations are typically conducted in a multiple reactor system.

The polydiene rubber that is comprised of repeat units that are derived from a conjugated diene monomer and sulfur. The polydiene rubber can, of course, be derived from more than one conjugated diolefin monomers and one or more additional monomers, such as vinyl aromatic monomers. The repeat units in the polydiene rubber that are derived from sulfur are in the backbone of the polymer. These repeat units that are derived from sulfur typically contain from 2 to 8 sulfur atoms ($—S_n—$). It is believed that $S_8$ molecules are incorporated into the backbone of the polymer by a ring opening reaction. In any case, the latex of the polydiene rubber is comprised of water, an emulsifier, and the polydiene rubber.

Asphalt cement can be modified with the polydiene rubber that is comprised of repeat units that are derived from a conjugated diene monomer and sulfur by simply mixing a latex of the polydiene rubber into hot asphalt. The latex of the polydiene rubber will typically be mixed into the asphalt at a temperature which is within the range of about 130° C. to about 230° C. The latex of the polydiene rubber may be added to the asphalt in an amount which is within the range of from about 1 part by weight to about 10 parts by weight (based upon the dry weight of the rubber). Preferably, from about 1 part by weight to about 6 parts by weight of the polydiene rubber is added with amounts within the range of from about 2 parts by weight to about 4 parts by weight being particularly preferred. After the latex of the polydiene rubber has been well dispersed throughout the asphalt, elemental sulfur can optionally be added to the polymer/asphalt blend. Normally from about 0.1 to about 5 parts by weight of sulfur is added per 100 parts by weight of the polydiene rubber. In most cases, it is preferred to utilize from about 1 to about 4 parts by weight of sulfur per 100 parts by weight of the polydiene rubber. It is typically more preferred to utilize from about 2 to about 3 parts by weight of sulfur per 100 parts by weight of the polydiene rubber. After the polydiene rubber and the sulfur has been thoroughly mixed with the asphalt cement, one should store the modified asphalt cement at elevated temperatures to avoid solidification prior to use.

Virtually any type of asphalt can be employed in making the asphalt cement compositions of this invention. Asphalt is defined by ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide and aromatic and chlorinated hydrocarbons. Bitumen is a generic term defined by ASTM as a class of black or dark-colored (solid, semi-solid or viscous) cementitious substances, natural or manufactured, composed principally of high molecular weight hydrocarbons, of which asphalts, tars, pitches, asphaltites are typical. ASTM further classifies asphalts or bituminous materials as solids, semi-solids or liquids using a penetration test for consistency or viscosity. In this classification, solid materials are those having a penetration at 25° C. under a load of 100 grams applied for 5 seconds, of not more than 10 decimillimeters (1 millimeter). Semi-solids are those having a penetration at 25° C. under a load of 100 grams applied for 5 seconds of more than 10 decimillimeters (1 millimeter) and a penetration at 25° C. under a load of 50 grams applied for 1 second of not more than 35 millimeters. Semi-solid and liquid asphalts predominate in commercial practice today.

Asphalts are usually specified in several grades for the same industry, differing in hardness and viscosity. Specifications of paving asphalt cements generally include five grades differing in either viscosity level at 60° C. or penetration level. Susceptibility of viscosity to temperatures is usually controlled in asphalt cement by its viscosity limits at a higher temperature such as 135° C. and a penetration or viscosity limit at a lower temperature such as 25° C. For asphalt cements, the newer viscosity grade designation is the mid-point of the viscosity range.

The asphalt materials that may be used in the present invention are those typically used for road paving, repair and maintenance purposes. Petroleum asphalts are the most common source of asphalt cements. Petroleum asphalts are produced from the refining of petroleum and used predominantly in paving and roofing applications. Petroleum asphalts, compared to native asphalts, are organic with only trace amounts of inorganic materials. Some representative examples of asphalt cements that may be used in the present invention have an ASTM grade of AC-2.5, AC-5, AC-10, AC-20 and AC-40. The preferred asphalt cements include AC-5, AC-10 and AC-20.

The present invention may contain other conventional additives in addition to the polydiene rubber, the asphalt cement, and optionally, the sulfur. Examples of conventional additives include antistripping compounds, fibers, release agents and fillers. Some specific examples of additives that can be employed include kaolin clay, calcium carbonate, bentonite clay, and cellulose fibers.

After the asphalt cement has been modified, it can be mixed with aggregate to make asphalt concrete using standard equipment and procedures utilized in making asphalt concrete. As a general rule, from about 1 weight percent to about 10 weight percent of the modified asphalt cement and from about 90 weight percent to about 99 weight percent aggregate will be included in the asphalt concrete. It is more typical for the asphalt concrete to contain from about 3 weight percent to about 8 weight percent of the modified asphalt cement and from about 92 weight percent to about 97 weight percent of the aggregate. It is normally preferred for the asphalt concrete to contain from about 4 weight percent to about 7 weight percent of the modified asphalt cement and from about 93 weight percent to about 96 weight percent of the aggregate.

The aggregate is mixed with the asphalt to attain an essentially homogeneous asphalt concrete. The aggregate is mixed with the asphalt cement utilizing conventional techniques and standard equipment. For instance, the aggregate can be mixed with asphalt to produce asphalt concrete on a continuous basis in a standard mixer.

Standard aggregate can be utilized in the practice of this invention. The aggregate is essentially a mixture containing rocks, stones, crushed stone, gravel and/or sand. The aggregate will typically have a wide distribution of particle sizes ranging from dust to golf ball size. The best particle size distribution varies from application to application. In many cases, it will be advantageous to coat the aggregate with latex in accordance with the teachings of U.S. Pat. No. 5,262,240 to improve resistance to stripping by water.

The asphalt concrete made using the modified asphalt cement of this invention can then be used to pave roads, highways, exit ramps, streets, driveways, parking lots, airport runways or airport taxiways utilizing conventional procedures. However, pavements made utilizing the asphalt concretes of this invention offer resistance to rutting, shoving and low temperature cracking. Additionally, they can be applied without encountering processing difficulties due to the latex used for the modification being incompatible with the asphalt.

This invention is illustrated by the following examples that are merely for the purpose of illustration and are not to be regarded as limiting the scope of the invention or the manner in which it can be practiced. Unless specifically indicated otherwise, all parts and percentages are given by weight.

EXAMPLE 1

In this experiment a latex of a polydiene rubber containing repeat units that were derived from 1,3-butadiene, styrene, and sulfur was prepared. In the procedure used emulsion rubbers containing several levels of sulfur added were prepared in 750 ml polymerization bottles. The recipe typically used is shown in Table I.

TABLE I

| | | | A | | B | |
|---|---|---|---|---|---|---|
| Material | Code | Act (%) | Act Pts | Actual Weight (grams) | Act Pts | Actual Weight (grams) |
| A. RO Water | w | 100 | 156.25 | 250.00 | | |
| Potassium phosphate | n | 100 | 0.178 | 0.28 | | |
| Hydrogenated mixed fatty acid | n | 10 | 2.661 | 4.26 | | |
| Potassium soap of disproportionated tall oil rosin | n | 20 | 1.395 | 2.23 | | |
| Sodium naphthalenesulfonate formaldehyde | n | 47.5 | 0.192 | 0.31 | | |
| Siponate A246L sodium lauryl sulfonate | n | 40 | 0.017 | 0.03 | | |
| B. Sulfur | n | 100 | 0 | | 0.5 | 0.80 |
| RO Water | w | 100 | 38.75 | 62.00 | 1.00 | 62.00 |
| C. Styrene | m | 100 | 25 | 40.00 | | |
| Tertary mercaptan | n | 100 | 0.1 | 0.16 | | |

TABLE I-continued

| | | A | | | B | |
|---|---|---|---|---|---|---|
| Material | Code | Act (%) | Act Pts | Actual Weight (grams) | Act Pts | Actual Weight (grams) |
| D. Sodium hydrosulfite | n | 100 | 0.1 | 0.16 | | |
| RO Water | w | 100 | 1 | 1.60 | | |
| E. RO Water | w | 100 | 4 | 6.40 | | |
| Sodium formaldehyde sulfoxylate | n | 76.62 | 0.03 | 0.05 | | |
| Ethylenediaminetetraacetic acid | n | 87.17 | 0.01 | 0.02 | | |
| F. Butadiene | b | 100 | 75 | 120.00 | | |
| G. Pinane hydroperoxide | n | 44 | 0.04 | 0.06 | | |
| H. RO Water | w | 100 | 3.1 | 4.96 | | |
| Sodium dimethyldithio carbamate | n | 40 | 0.1 | 0.16 | | |
| Diethyl hydroxylamine | n | 85 | 0.01 | 0.02 | | |

The materials in Section A were masterbatched together, then charged into 750 ml bottles. The pH was typically within the range of 10.5 to 11.0, if not it was adjusted with the addition of a small amount of 10% sodium hydroxide solution. The amount of sulfur charged (Section B) ranged from 0 to 2.0 parts. The sulfur was weighed into a small bottle, RO water was added and then the mixture was sparged with nitrogen for 10 minutes before being added to the polymerization bottle. The materials of Sections C, D, E and F were added, the bottle was capped, and then placed into a water bath that was maintained at a temperature of 50° F. (10° C.). The bottles were tumbled for about 15 minutes to reach constant temperature, then the pinane hydroperoxide of Section G was added via syringe. The bottles were tumbled and maintained at a temperature of 10° C. until a monomer conversion of 65% (as determined by solids sampling) was attained. Polymerization times ranged from 6 to 12 hours. Additional shots of activator (see Section E) and pinane hydroperoxide (see Section G) were added as needed to speed up the reaction if the solids content was low after two hours of polymerization time. The polymerization was shortstopped with a conventional dimethyldithiocarbamate/diethyl hydroxylamine solution in water (see Section H).

Latex from the polymerization bottles were stripped on a Buchi Roto evaporator to remove unreacted styrene monomer. Typically, 2000 grams of water was added, then stripped off. This reduced the residual styrene level to an undetectable level. The latex was then filtered through cheesecloth.

EXAMPLE 2

In this experiment, asphalt compositions were made with the latex of the modified sulfur containing polydiene rubber synthesized in Example 1. In one case, 2 weight percent sulfur was added to the asphalt composition and compared to an asphalt composition where sulfur was not added. A AC-20 asphalt from Kansas was used in this experiment. In the procedure used, 15.5 grams of the rubber was slowly stirred into the asphalt over a period of about 45 minutes at a temperature of about 350° F.–360° F. (177° C.–182° C.). The rubbers were added at a level of 3 weight percent, based upon the total weight of the polymer/asphalt blends. Then, the polymer/asphalt blends were mixed for about 15 minutes in a Ross high speed mixer which was operated at a speed of 4200 rpm. Elemental sulfur was subsequently mixed into the polymer/asphalt blend over a period of about 2 minutes (in making one composition) and the mixture was then slowly stirred over a period of 1 hour at a temperature of 350° F.–360° F. (177° C.–182° C.).

The physical properties of the modified asphalt cements made were then determined using standard test procedures. The strength and flexibility of the asphalt binder cement at moderate or low temperatures are measured by force ductility and tenacity. These properties measure the resistance to deformation. Increasing strength gives greater resistance to surface abrasion and wear and provides better retention of aggregate. Ductility was determined by ASTM D113. The force ductility, elastic recovery, and tenacity of the two modified asphalt samples is reported in Table II.

TABLE II

| | No Sulfur Added | Sulfur Added |
|---|---|---|
| Ductility, 4° C.; cm | 23.5 | 30 |
| Elastic Recovery @ 10° C. | 40.0% | 52.5% |
| Force Ductility, 4° C., 800% | 2.3 lbs | 3.2 lbs |
| Tenacity, in-lbs | 26.4 | 110.5 |
| Compatibility (° C.) | 0.6 | 0.5 |

The polydiene rubber containing repeat units that were derived from sulfur was also determined to have excellent compatibility with asphalt. This was determined by utilizing a separation test wherein the modified asphalt sample was placed in a tube having a diameter of 1 inch (2.54 cm) and a length of 5.5 inches (14 cm) and heat in an oven at 325° F. (163° C.) for 48 hours. The tube was maintained in a vertical position throughout the heating step. The tube containing the asphalt sample was then placed in a freezer at about 20° F. (−7° C.) for a minimum of 4 hours. Then the sample was removed from the freezer and cut into three portions of equal length. The ring and ball softening point of the top and bottom portions of the sample was then determined by ASTM Method D36. Compatibility is considered to be excellent in cases where the difference in temperature between the softening points between the top and bottom samples is no greater than 2° C. In the case at hand, this temperature difference was only 0.5° C. in one case and 0.6° C. in the other case. Thus, the polydiene rubbers exhibited excellent compatibility with the asphalt. As can be seen from Table II, the addition of sulfur the asphalt composition greatly increased the tenacity.

EXAMPLE 3

In this experiment a conventional styrene-butadiene rubber that did not contain repeat units derived from sulfur (made with a recipe that was otherwise identical) was used to modify asphalt using the procedure described in Example 2. However, the rubber was grossly incompatible with the asphalt and physical properties were not tested.

EXAMPLE 4

The procedure described in Example 2 was repeated in this experiment except that AC-20 asphalt from Mississippi was substituted for the AC-20 asphalt from Kansas used in Example 2. The ductility, elastic recovery, tenacity, and compatibility of the two modified asphalt samples is reported in Table III.

TABLE III

|  | No Sulfur Added | Sulfur Added |
| --- | --- | --- |
| Ductility, 4° C.; cm | 80 | — |
| Elastic Recovery @ 10° C. | 40.0% | 55.0% |
| Force Ductility, 4° C., 800% | 0.9 | 2.0 |
| Tenacity, in-lbs | 44.9 | 107.0 |
| Compatibility (° C.) | 0.1 | 0.3 |

As can be seen from Table III, the polydiene rubber had excellent compatibility with the AC-20 asphalt from Mississippi. Again tenacity was greatly increased by adding free sulfur to the asphalt composition.

EXAMPLE 5

The procedure described in Example 2 was repeated in this experiment except that AC-20 asphalt from Texas and AC-20 asphalt (from Kentucky) was substituted for the AC-20 asphalt from Kansas used in Example 2. In the procedure used 3 weight percent free sulfur was added in both cases. The ductility, elastic recovery, tenacity, and compatibility of the two modified asphalt samples is reported in Table IV.

TABLE IV

|  | TFA Asphalt | Asphalt |
| --- | --- | --- |
| Ductility, 4° C.; cm | 48 | 25 |
| Elastic Recovery @ 10° C. | 45.0% | 35.0% |
| Force Ductility, 4° C., 800% | 1.0 | 1.5 |
| Tenacity, in-lbs | 49.1 | 39.8 |
| Compatibility (° C.) | 0.5 | 0.9 |

As can be seen from Table IV, the polydiene rubber had excellent compatibility with both the AC-20 asphalt from Texas and the AC-20 asphalt from Kentucky. It is unusual for a polymer to have good compatibility with such a wide array of asphalts. However, by incorporating sulfur into the backbone of the rubber excellent compatibility with all of the asphalt samples which came from a wide variety of geographic locations was realized.

EXAMPLE 6

In this experiment a conventional styrene-butadiene rubber (that did not contain repeat units derived from sulfur) was used to modify AC-20 asphalt from Texas and AC-20 asphalt from Kentucky using the procedure described in Example 2. However, the rubber was grossly incompatible with both of the asphalt samples and physical properties were not tested.

While certain representative embodiments and details have been shown for the purpose of illustrating the subject invention, it will be apparent to those skilled in this art that various changes and modifications can be made therein without departing from the scope of the subject invention.

What is claimed is:

1. An asphalt concrete which is comprised of (A) from about 90 weight percent to about 99 weight percent of an aggregate and (B) from about 1 weight percent to about 10 weight percent of a modified asphalt cement which is comprised of (i) from about 90 weight percent to about 99 weight percent asphalt; (ii) from about 1 weight percent to about 10 weight percent of a polydiene rubber that is comprised of repeat units that are derived from a conjugated diene monomer and sulfur.

2. An asphalt concrete as specified in claim 1 wherein said asphalt concrete contains from about 3 weight percent to about 8 weight percent of the modified asphalt cement.

3. An asphalt concrete as specified in claim 1 wherein said asphalt concrete contains from about 4 weight percent to about 7 weight percent of the modified asphalt cement.

4. An asphalt concrete as specified in claim 1 wherein from about 0.05 weight percent to about 5 weight percent of the repeat units in the polydiene rubber are derived from sulfur, and wherein the repeat units that are derived from sulfur are in the backbone of the polydiene rubber.

5. An asphalt concrete as specified in claim 2 wherein from about 0.05 weight percent to about 5 weight percent of the repeat units in the polydiene rubber are derived from sulfur.

6. An asphalt concrete as specified in claim 5 wherein the repeat units that are derived from sulfur are in the backbone of the polydiene rubber.

7. An asphalt concrete as specified in claim 2 wherein the conjugated diolefin monomer is 1,3-butadiene.

8. An asphalt concrete as specified in claim 7 wherein the polydiene rubber is further comprised of repeat units that are derived from a vinyl aromatic monomer.

9. An asphalt concrete as specified in claim 8 wherein the vinyl aromatic monomer is styrene.

10. An asphalt concrete as specified in claim 3 wherein from about 0.1 weight percent to about 1 weight percent of the repeat units in the polydiene rubber are derived from sulfur.

11. An asphalt concrete as specified in claim 3 wherein from about 0.3 weight percent to about 0.7 weight percent of the repeat units in the polydiene rubber are derived from sulfur.

12. An asphalt concrete as specified in claim 10 which is further comprised of sulfur wherein the sulfur is present at a level which is within the range of about 0.1 weight percent to about 5 weight percent, based upon the weight of the polydiene rubber.

13. An asphalt concrete as specified in claim 12 wherein the modified asphalt cement contains from about 1 weight percent to about 6 weight percent of the polydiene rubber.

14. An asphalt concrete as specified in claim 12 wherein the modified asphalt cement contains from about 2 weight percent to about 4 weight percent of the polydiene rubber.

15. An asphalt concrete as specified in claim 2 wherein the asphalt has an ASTM grade of AC-10.

16. An asphalt concrete as specified in claim 3 wherein the asphalt has an ASTM grade of AC-20.

* * * * *